June 28, 1932.  C. A. HUPP  1,865,011
RUBBER TABLE COVER
Filed May 31, 1930

INVENTOR,
Charles A. Hupp,
By Minturn & Minturn,
Attorneys.

Patented June 28, 1932

1,865,011

UNITED STATES PATENT OFFICE

CHARLES A. HUPP, OF INDIANAPOLIS, INDIANA, ASSIGNOR OF ONE-HALF TO WAKE-FIELD M. WILT, OF SYRACUSE, INDIANA

RUBBER TABLE COVER

Application filed May 31, 1930. Serial No. 458,878.

Rubber covers for table tops of wood have not proved entirely satisfactory on account of the warping tendency of the wood under varying degrees of temperature and of moisture, but more particularly on account of the shrinkage of the rubber itself, which, although it may be initially smooth, and tight, against the upper face, side-edges, and perhaps underlapping the wood top, to which it may be cemented, shrinks and draws after a few weeks to the extent of curling the edges of the rubber away and breaking the cemented joints.

The object of this invention is to fasten a rubber cover securely to a table top and particularly to fasten the edges of the rubber so it cannot under any circumstances become loose and curl away from the table top.

The object also is to provide a rubber cover which can be applied properly to a wood table top, without special training or skill, in order that the rubber covers may be made and sold in quantities by the rubber manufacturers for application to the tables by others.

I accomplish the above and other objects which will hereinafter appear, by the means illustrated in the accompanying drawing, in which.

Like characters indicate like parts in the several views of the drawing.

Figure 1:
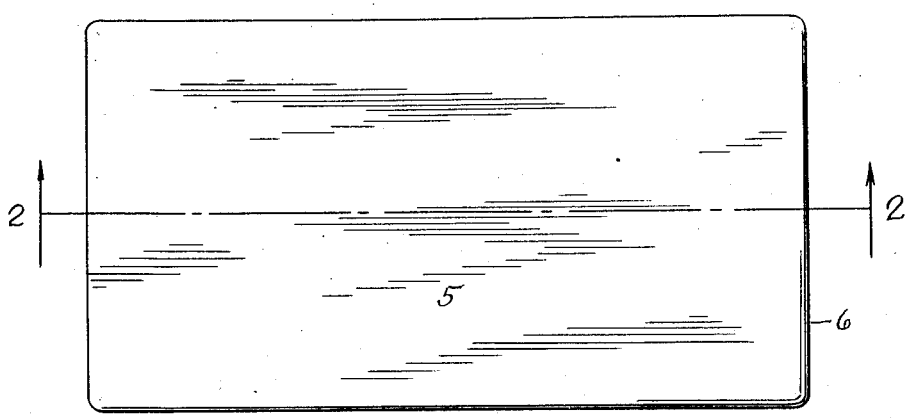
Fig. 1 is a top plan view of a table top with my invention installed.
Figure 2:
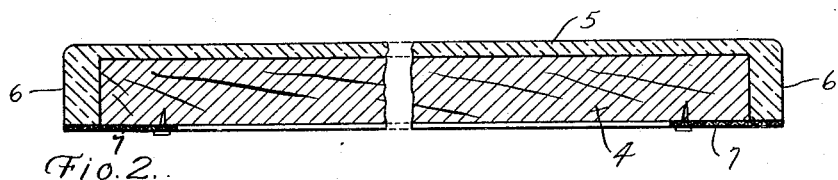
Fig. 2, is a vertical section on the line 2—2 of Fig. 1 on a larger scale and broken away at the middle to bring the showing within the compass of the sheet.

Referring to the drawing, the reference character 4 denotes a wooden table top which may be round, oval, rectangular or any desired shape and size, here shown as rectangular with rounded corners.

The cover is formed from a sheet of rubber or equivalent material having a body 5 to fit snugly over the top of the table top 4 and having an integral skirt 6, preferably of much thicker rubber, depending therefrom against the edges of the table top. The purpose of making the skirt thick is to strengthen the angles where it joins the cover and cushion the edges of the table, for the reason that these parts are subjected to greater impact and wear than the cover.

When the tightness of the cover on the table is increased by the shrinkage of the rubber, the action on the skirt 6 is to curl and flare it out at the bottom, and to prevent this occurrence I vulcanize a flange of stout material 7, preferably fabric and rubber to the lower edge of the skirt. The canvas flange 7 extends inwardly of the skirt 6 for an appreciable distance and is secured to the under side of the table cover 4 by a suitable adhesive agent as cement or glue, or by tacks, or by tacks and an adhesive, which will resist all loosening tendency and hold the skirt 6 in place against the edge of the table top. The rubber cover is either cemented to the table top or it may be drawn taut thereon and held by cementing the skirts to the edges of the table top, or held by fastening the flange 7 to the under side of the top or it may be vulcanized to the top or held by the tension of the rubber only.

Figure 3:
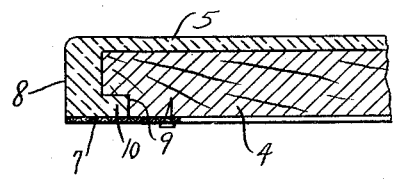
Fig. 3 is a detail section of a modified form of my invention.

In the modification shown in Fig. 3, the lower corner of the edge of the table top is rabbeted out as shown at 9, and the skirt 8 is molded with a bead or rib 10 which fits in the rabbet and assists in resisting the pull caused by the shrinking of the rubber in the cover and skirt. The rib 10 also increases the holding area for the attachment of the canvas flange 7.

It is obvious that departures in structural details may be made without departing from the spirit of my invention.

What I claim as new is:

1. As a new article of manufacture, a molded rubber table cover comprising a body, a depending rubber skirt integral with the margin of the body, and an inwardly directed canvas flange, substantially non-stretchable, vulcanized to the lower edge of the skirt as a tacking strip.

2. In combination, a table top, and a molded rubber table top cover comprising a sheet body member, an integral marginal skirt much thicker than the body member, and an inwardly directed flange much thinner than the body member vulcanized to the lower edge of the skirt and fastened to and against the under side of the table top.

3. In combination, a table top rabbetted on its lower corner, and a molded rubber table top cover comprising a sheet body-member, an integral marginal skirt having a bead on its inner side near its lower edge to enter the rabbet in the table top and an inwardly directed canvas flange vulcanized to the lower edge of the skirt and fastened to and against the under side of the table top.

In testimony whereof I affix my signature.

CHARLES A. HUPP.